July 21, 1925.  
T. B. SLATE  
METHOD AND APPARATUS FOR PRODUCING CARBON DIOXIDE SNOW  
AND FOR SEPARATING SAME FROM THE GAS  
Original Filed Jan. 10, 1924
1,546,682
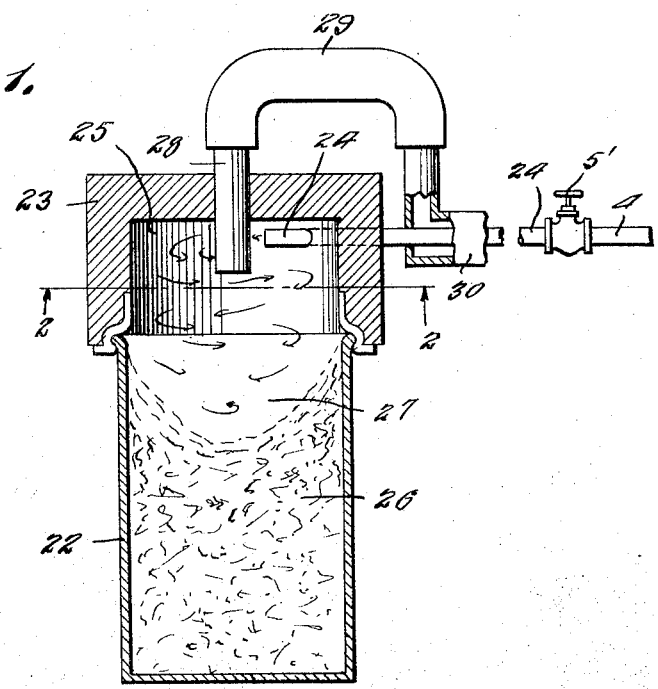
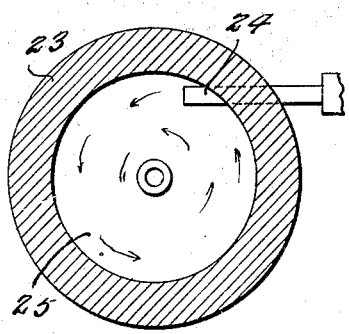
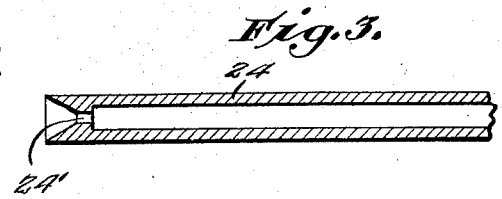
Inventor  
Thomas B. Slate  
By Lester L. Sargent  
Attorney Patented July 21, 1925.

1,546,682

UNITED STATES PATENT OFFICE.

THOMAS B. SLATE, OF NEW YORK, N. Y.

METHOD AND APPARATUS FOR PRODUCING CARBON-DIOXIDE SNOW AND FOR SEPARATING SAME FROM THE GAS.

Original application filed January 10, 1924, Serial No. 685,482. Divided and this application filed April 5, 1924. Serial No. 704,527.

*To all whom it may concern:*

Be it known that I, THOMAS B. SLATE, a citizen of the United States, residing at New York city, in the county of New York and State of New York, have invented a new and useful Method and Apparatus for Producing Carbon-Dioxide Snow and for Separating Same from the Gas, of which the following is a specification.

This application is a division of my co-pending application, Serial 685,482, filed Jan. 10, 1924. My object is to produce carbon dioxide snow for refrigeration and other purposes by a novel method, and to provide a novel apparatus for carrying out the invention. One form of suitable apparatus is illustrated in the accompanying drawings, in which—

Figure 1 is a vertical section partly in elevation of my apparatus;

Fig. 2 is a horizontal section on line 2—2 of Fig. 1; and

Fig. 3 is a detail sectional view of nozzle 24.

Like characters of reference indicate like parts in each of the views.

Referring to Fig. 1, I provide a suitable snow chamber 22. Said snow chamber 22 is provided with a circular dome or converting chamber 23 into which the nozzle 24 opens. Said nozzle 24 is connected to pipe 4 which leads to a suitable source of supply of liquid carbon dioxide under pressure and is controlled by valve 5'. The nozzle 24 opens into dome 25 at one side thereof to cause a whirling movement of the gas and snow discharging from nozzle 24. I also provide a gas discharging pipe 28, having one open end in communication with the interior of the snow chamber 22 preferably at the central portion thereof and having the other open end extending to and opening into a distant part of any chamber to be refrigerated, such as a refrigerator car.

The gas discharging pipe 28 opens into a suitable yoke pipe 29 which in turn opens into the relatively large pipe 30 inclosing pipe or nozzle 24 exterior to the dome 23 for cooling the intake nozzle 24, as shown in Fig. 1. Pipe 30 is of sufficient capacity to permit the gas to flow freely around and cool nozzle 24. The gas discharged through pipe 28 into the chamber to be refrigerated is used for displacing the air, chilling and removing moisture from the chamber to be refrigerated and its contents. The element 26 represents the carbon dioxide snow formed by the liquid carbon dioxide passing through the restricted passage in the end of nozzle 24, as shown in detail in Fig. 3; and its expansion from high pressure to a gas at atmospheric pressure refrigerates one portion (approximately one-third) of its weight to carbon dioxide snow, the other portion going to gas. The snow being heavier than the gas settles to the outside and bottom of the container by centrifugal force and by gravity. The gas being lighter than the snow collects in the higher and central portion and is forced to the position in the drawings by the whirling movement of the inflowing gas and escapes through the discharge pipe 28. This action effects a conical pocket 27 that will build up towards pipe 8 until the chamber 22 is completely filled.

When the snow chamber 22 has been filled with carbon dioxide snow the valve 5' is closed and the pipe 4 is disconnected. The walls of chamber 22 are insulated. It will be understood why this is necessary inasmuch as the temperature of the carbon dioxide snow is approximately between 108 and 112 degrees below zero Fahrenheit. The gas evaporating from the carbon dioxide snow leaves at a temperature of approximately 80 degrees below zero Fahrenheit and as it passes out through pipe 28 it absorbs heat.

The above-described method of making the carbon dioxide snow may be used for making snow for various purposes by applying a removable chamber 22 to dome or converting chamber 23 and when filled this removable chamber 22 may be taken off and emptied and replaced for refilling. In this instance, where I do not need the escaping gas from this device for other purposes, it may first be passed from pipe 28 to a yoke pipe 29, and thence to large pipe 30 surrounding the liquid supply pipe 24 and 4, whereby to lower the temperature of the liquid carbon dioxide entering the converting chamber 23, and to cause a greater proportion of the carbon dioxide to turn to snow at passage 24. Pipe 30 may then lead to a suitable compressor and the carbon dioxide gas may be compressed back to the supply line, thereby saving the gas which escapes from the snow or converting chamber.

What I claim is:

1. A method for producing carbon dioxide snow, consisting in releasing liquid carbon dioxide in a closed chamber, reducing the pressure on the liquid carbon dioxide as it enters said chamber to convert a portion of the liquid to snow and the remaining portion to gas, and separating the carbon dioxide snow from the gas by the operation of both centrifugal force and gravity.

2. In combination with the apparatus for making carbon dioxide snow by the method described, means for separating the snow from the escaping gas by a combination of centrifugal force and gravity, and means for conducting said escaping gas to desired portions of a chamber to be refrigerated to displace air and moisture from the chamber and lower the temperature of the chamber at the same time for efficiently preserving perishable products.

3. An apparatus for producing carbon dioxide snow, comprising a closed insulated cylindrical converting chamber, a conduit opening tangentially into said chamber and terminating in a restricted passage for the expansion of the liquid carbon dioxide, a source of supply of liquid carbon dioxide under high pressure with which said conduit communicates, and a discharge conduit for the escape of the gas not converted into snow and permitting of the utilization of the escaping carbon dioxide gas for other useful purposes.

THOMAS B. SLATE.